Aug. 4, 1959     J. E. HALL, SR     2,897,899
TOOL MOUNTINGS

Original Filed Nov. 14, 1951     2 Sheets-Sheet 1

INVENTOR.
Jesse E. Hall, Sr.
BY
ATTORNEY.

Aug. 4, 1959 J. E. HALL, SR 2,897,899
TOOL MOUNTINGS

Original Filed Nov. 14, 1951 2 Sheets-Sheet 2

INVENTOR.
Jesse E. Hall, Sr.,
BY
ATTORNEY.

United States Patent Office 2,897,899
Patented Aug. 4, 1959

2,897,899

TOOL MOUNTINGS

Jesse E. Hall, Sr., Weatherford, Tex.

Original application November 14, 1951, Serial No. 256,194, now Patent No. 2,797,756, dated July 2, 1957. Divided and this application June 26, 1957, Serial No. 668,212

5 Claims. (Cl. 166—241)

This invention relates to improvements in a mounting for oil and water well tools and refers more particularly to a tapered race and wedge assembly adapted to be used with well tools which are applied to the exterior of well casing, tubing or drill pipe, and rendering the tools more easily mountable on or demountable from the casing.

This application is a division of my co-pending application Serial No. 256,194 filed November 14, 1951, now Patent Number 2,797,756.

It has been common practice heretofore in applying well tools to the exterior of pipe or casing to weld the tools directly to the pipe, or where it is desired to have the tool rotatable on the pipe, to weld lugs or stops to the pipe above and below or between the collars of the tool as abutments to restrict its longitudinal movement along the pipe within definite limits. As an example, in mounting centralizers upon casing a circular stop in the form of a ring, band or collar may be fixedly welded to the exterior of the casing between the collars of the centralizers, or one collar of the centralizer may be fixed by welding with the other slidable longitudinally within limits to permit spreading and constriction of the blades or springs. In the application of scratchers utilizing circular sleeves, bands or collar supports for the abrading wires, circumferentially spaced lugs are usually welded above and below the scratcher collar to permit free rotation and limited longitudinal movement.

In the application of such tools therefor it is necessary to have at the well site welding equipment when the tools are to be applied and considerable time is consumed, to say nothing of the expense and possible harm to the pipe or casing resulting from such welding operation.

An object, therefore, of the instant invention is to provide a simple and effective arrangement by means of which well tools of this type may be applied to the exterior surface of pipe as the pipe is run into the well.

Another object is to provide a well tool mounting which eliminates the welding operations previously required.

Still another object is to provide a well tool mounting which permits removal of the tool and avoids the necessity of welding equipment for burning off the lugs or holding stops from the pipe should it be desired to remove the tools for later use.

A further object is to provide a mounting which considerably reduces the expense of applying tools of this type to the pipe.

Other and further objects and advantages will appear from the description which follows.

In the accompanying drawings which form a part of the instant specification and are to be read in conjunction therewith, and in which like reference numerals indicate like parts in the various views.

Figure 1:
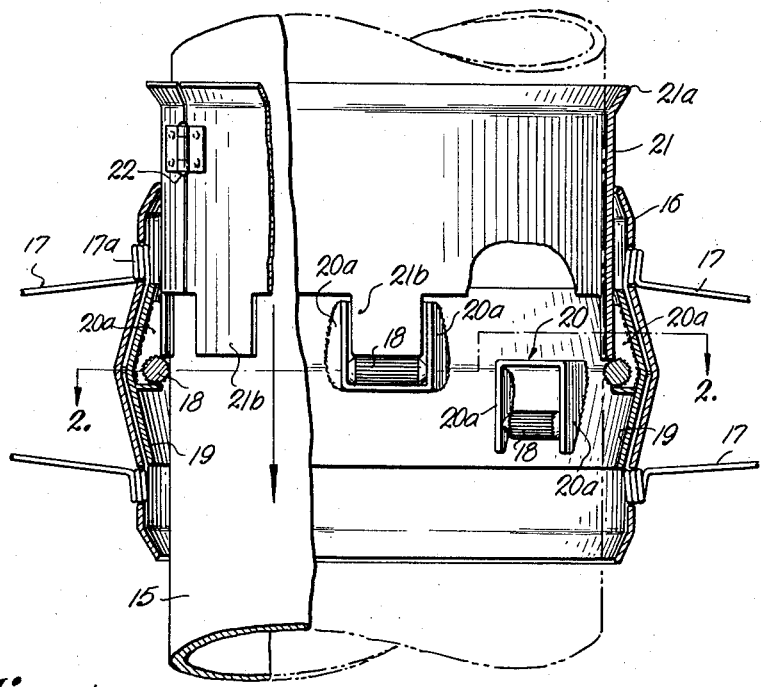
Fig. 1 is a side elevation of a scratcher mounted on a casing with portions of the casing removed to reveal the details of a mounting embodying the invention and showing a portion of the neutralizer sleeve employed in the application and removal of the scratcher from the pipe.
Figure 2:
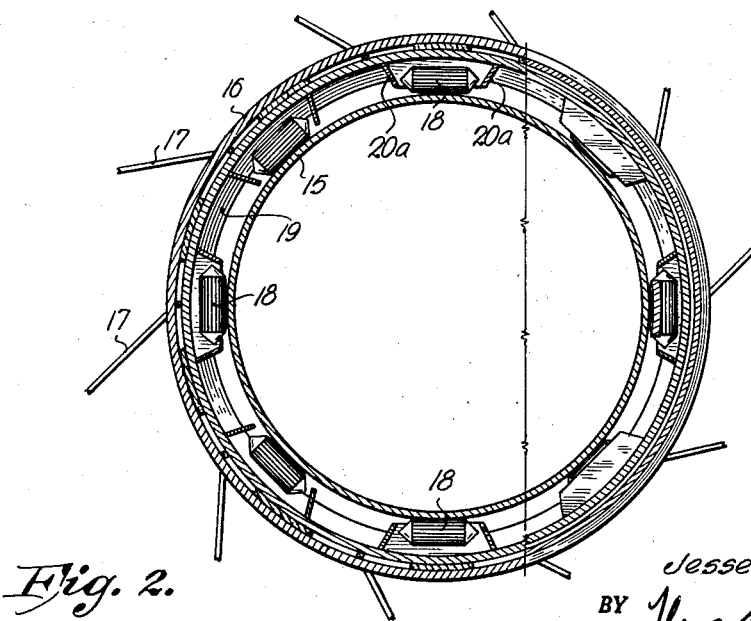
Fig. 2 is a view taken along the line 2—2 of Fig. 1 in the direction of the arrows.

Referring to the drawings and initially to the construction shown in Figs. 1 and 2, at 15 is shown a short length of casing. Upon the exterior of the casing is mounted a scratcher comprising a collar 16 from which extend abrading wires or whiskers 17. The principal function of the abrading wires is to scrape the accumulated layer of mud from the well bore during well conditioning operations preliminary to the cementing of the well. Insofar as including the abrading wires or whiskers 17, the scratcher is of conventional design, the abrading wires being affixed or anchored to the collar in any suitable fashion. Coils 17a formed in the wires between their anchored and free ends or substantially where the wires pass through apertures in the collar give the wires greater resiliency and flexibility as well as longer life to withstand the twisting and bending stress imposed upon them when the pipe is reciprocated in the well conditioning operation.

Disposed between the collar and the casing are a plurality of rollers 18. These rollers are of solid metal with the outside surface preferably ridged, crinkled, knurled or denticulated to give a roughened surface and the ends preferably tapered. The rollers are placed at intervals in staggered arrangement with a race member 19, the race being concentrically positioned within the scratcher collar. The internal surfaces of the race are tapered with the greatest space being located between the race and the pipe at its midsection, the outer edges of the race being closest to the pipe.

Provided on the inner surface of the race are generally U-shaped enclosures or keepers 20, one for each roller. Each race has two generally parallel guide legs 20a and these two legs are likewise tapered with their greatest height at the midsection of the race and their lesser height toward the rims of the race. Preferably, the legs 20a of the keepers are sloped toward one another to hold the tapered ends of the rollers, permitting free rotation along the surface of the pipe and between the pipe surface and inner tapered surfaces of the race by preventing displacement of the rollers from their individual enclosures or keepers. One set of rollers is so positioned within the race to wedge against one tapered surface, while the second set of rollers is positioned to wedge against the opposite tapered surface. Thus with axial movement of the pipe in either direction with respect to the scratcher, or with axial movement of the scratcher in either direction with respect to the pipe, one set of rollers will jam or wedge between the pipe surface and a tapered surface of the race.

Beneath the upper edge of the scratcher collar shown in Fig. 1 is a neutralizer sleeve 21 formed in two parts, each part having the shape of a semi-cylindrical sleeve with one flared edge 21a, said parts hinged together as indicated at 22. The function of this sleeve, obvious from the drawing, is to hold the wedge rollers 18 in a neutral position when the scratcher is slipped downwardly along the casing to the desired location in mounting it thereon, or when removing the scratcher therefrom. It will be noted that the lower end of the neutralizer sleeve is formed with projecting tongues 21b which are adapted to move between the legs 20a of the keepers in order to contact and maintain the rollers at a point where they are not capable of wedging between the tapered race and pipe. It will be evident, of course, that only one neutralizer sleeve is required, since the lower roller members will be moved into a neutralized position by virtue of movement of the collar or scratcher downwardly on the pipe. It will be understood that when the scratcher is located in the desired position relative the pipe, the neutralizer sleeve 21 is withdrawn and separated so that it can be withdrawn laterally from the pipe.

While in Figs. 1 and 2 I have shown a scratcher having integral therewith the wedge means, it will, of course, be understood that the collar portion alone can be utilized as a stop collar. In this case the abrading wires would not be present.

Instead of one piece integral collars or scratchers, the circular bands which form the collar or the support for the scratcher wires are sometimes hinged to facilitate application of the tool to the casing. Such construction is shown in Figs. 3–6, inclusive.

Figure 5:
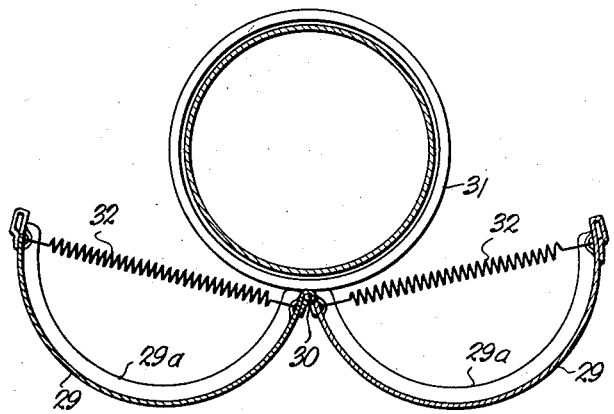
Fig. 5 is a transverse section through the collar of Fig. 3 or scratcher of Fig. 4 showing it as ready to be applied to a casing.
Figure 6:
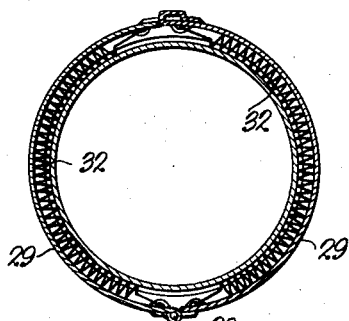
Fig. 6 is a transverse section showing the collar or scratcher in closed position surrounding the casing.

As noted in Figs. 5 and 6, the collar is formed in two semi-circular parts 29 which are hinged as at 30. The halves of the collar are adapted to close about a tapered race 31, end flanges 29a being provided on the collar halves to confine the race from slipping axially from the collar. The race 31 may be either a continuous annular member, or split and secured to the half sections of the collar. The wedging elements in this modification comprise two coil springs indicated at 32, attached at their ends near the outer edges of the halves of the collar by hooks, loops or eyes. When the tool collar is closed about the pipe as shown in Fig. 6, the two springs conform to the circular periphery of the pipe. It will be understood that the end portions of springs 32 must remain relatively fixed by virtue of their attachment to the two hinged collar sections. However, the medial portion of each spring still is free to shift up or down and wedge in the tapered races as described. While the wedging action is localized rather than being distributed uniformly about the entire circumference of the well casing, it nevertheless is effective to produce the requisite locking of the collar.

Figure 3:
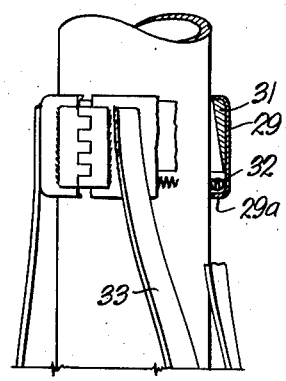
Fig. 3 is an elevation of the upper collar of a centralizer equipped with the invention, portions of the collar and associated parts being broken away and shown in section for purposes of illustration.

In Fig. 3 the embodiment of the invention disclosed in Figs. 5 and 6 is shown as applied to the upper collar of a centralizer. As will be noted the centralizer collar is channel shaped forming an annular space between the casing 15 and the inside surface of the collar. Within the upper collar is the race 31 tapered from the upper rim outwardly to the inner surface of the centralizer collar. Between the race and pipe is a wedge member which is illustrated as being in the form of the coil spring of Figs. 5 and 6. It will be understood, of course, that the lower end of the centralizer has a similar collar and race with the race tapered in the opposite direction. The collars of the centralizer are hinged so the tool may be opened and applied to the surface of the pipe, then closed without the necessity of slipping it along the pipe from one end thereof. The lower collar is connected with the upper collar by means of the blades 33.

The wedge roller and race assembly of Fig. 1 can be applied to centralizer collars as well as to scratchers and ordinary stop collars, as will be evident. The hinge provision can also be incorporated since the individual rollers are carried within the collar by their guide means previously described.

Figure 4:
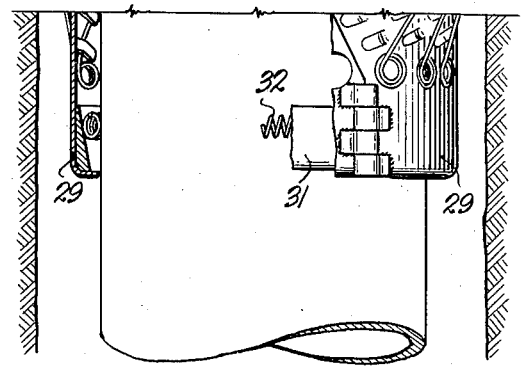
Fig. 4 is a fragmentary elevation of a scratcher equipped with a modified form of the invention, the scratcher collar being hinged, portions of the collar and associated wedging and race members being shown in section for purposes of illustration.

Fig. 4 shows the arrangement of Figs. 5 and 6 applied to a hinged scratcher. As will be noted, the scratcher collar is hinged and is arranged to enclose the tapered race 31. The wedging assembly in this embodiment is illustrated as being the two-part spring 32 of Figs. 5 and 6.

From the foregoing it will be seen that the tool mounting is adaptable for use with any type of tool employing a collar to be affixed to the exterior of a casing, pipe or tubing. The mounting is particularly adapted to scratchers and centralizers. In the case of scratchers the collar automatically is released from the pipe at the end of each stroke during reciprocation, permitting its free rotation and relieving of the bending stress upon the wires caused by reversal of the pipe movement. The mounting as applied to the collars of the centralizer fixes the leading collar whichever way the pipe is axially moved either in reciprocation of the pipe or when the casing is run into or out of the hole.

In some cases it may be found advantageous to make the races removable from the collar to facilitate application of the tool to the pipe.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the drawings is to be interpreted as illustrative and not in a limiting sense.

Having thus described my invention, I claim:

1. A mounting for the application of well tools to the exterior of a well casing comprising an annular race adapted to surround the casing, the bore of the race tapered axially throughout a portion of its length, the smallest diameter of said bore being appreciably larger than the outside diameter of said casing, a plurality of wedge roller enclosures within the race, and a wedge roller in each enclosure, said wedge rollers operable upon movement of the race in one direction to move between the race and casing to prevent further movement in such direction.

2. A mounting as in claim 1 including means insertable axially within the race and constructed to engage the rollers to shift them away from the smallest diameter toward the larger diameter of the bore thus to render the wedge rollers inoperable.

3. A mounting as in claim 1 wherein said enclosures have side walls permitting axial movement of the rollers but maintaining the rollers connected at all times with the race.

4. A mounting for the application of well tools, such as scratchers and centralizers, to the exterior of a well casing, comprising a sleeve whose bore is tapered axially throughout a portion of its length, smallest diameter of said bore being appreciably larger than the outside diameter of the casing, said sleeve being divided longitudinally into separable complementary segments to permit sidewise application on the sleeve to the casing, a flexible band for each segment having its ends secured to the extremities of the associated segment, the medial section of each band being shiftable axially of the sleeve to wedge between the exterior of the casing and the tapered bore of the sleeve upon axial shifting of the sleeve in one direction relative to the casing.

5. A mounting as in claim 4 wherein each of said flexible bands is a coiled tension spring.

References Cited in the file of this patent

UNITED STATES PATENTS

| | | |
|---|---|---|
| 2,182,797 | Dillon | Dec. 12, 1939 |
| 2,184,376 | Beyer et al. | Dec. 26, 1939 |
| 2,374,317 | Wright | Apr. 24, 1945 |
| 2,413,450 | Johnsen | Dec. 31, 1946 |
| 2,628,682 | Wright | Feb. 17, 1953 |